(12) United States Patent
Yoon et al.

(10) Patent No.: US 11,158,895 B2
(45) Date of Patent: Oct. 26, 2021

(54) BATTERY MODULE, BATTERY PACK INCLUDING BATTERY MODULE, AND VEHICLE INCLUDING BATTERY PACK

(71) Applicant: LG Chem, Ltd., Seoul (KR)

(72) Inventors: Ji-Su Yoon, Daejeon (KR); Dal-Mo Kang, Daejeon (KR); Su-Chang Kim, Daejeon (KR); Jeong-O Mun, Daejeon (KR); Jae-Uk Ryu, Daejeon (KR); Ho-June Chi, Daejeon (KR)

(73) Assignee: LG Chem, Ltd.

( * ) Notice: Subject to any disclaimer, the term of this patent is extended or adjusted under 35 U.S.C. 154(b) by 62 days.

(21) Appl. No.: 16/464,810

(22) PCT Filed: Apr. 3, 2018

(86) PCT No.: PCT/KR2018/003940
§ 371 (c)(1),
(2) Date: May 29, 2019

(87) PCT Pub. No.: WO2018/230819
PCT Pub. Date: Dec. 20, 2018

(65) Prior Publication Data
US 2019/0348727 A1  Nov. 14, 2019

(30) Foreign Application Priority Data

Jun. 16, 2017  (KR) .................. 10-2017-0076764

(51) Int. Cl.
*H01M 10/6554* (2014.01)
*H01M 50/10* (2021.01)
(Continued)

(52) U.S. Cl.
CPC ....... *H01M 10/6554* (2015.04); *H01M 50/10* (2021.01); *H01M 50/20* (2021.01); *H01M 50/50* (2021.01)

(58) Field of Classification Search
None
See application file for complete search history.

(56) References Cited

U.S. PATENT DOCUMENTS

| | | |
|---|---|---|
| 2006/0166089 A1 | 7/2006 | Suzuki et al. |
| 2010/0021802 A1 | 1/2010 | Yang et al. |
| | (Continued) | |

FOREIGN PATENT DOCUMENTS

| | | |
|---|---|---|
| CN | 106688121 A | 5/2017 |
| EP | 3171448 A1 | 5/2017 |
| | (Continued) | |

OTHER PUBLICATIONS

Partial Supplementary European Search Report for Application No. EP 18818014.5 dated Jan. 20, 2020, 8 pages.
(Continued)

*Primary Examiner* — Maria Laios
*Assistant Examiner* — Bartholomew A Hornsby
(74) *Attorney, Agent, or Firm* — Lerner, David, Littenberg, Krumholz & Mentlik, LLP (57) ABSTRACT

Disclosed is a battery module, which includes: at least one battery cell having electrode leads protruding at first and second opposite sides thereof; and at least one cell case each covering the first and second sides and an upper side of a corresponding one of the at least one battery cell and each including a pair of bus bars each having one end connected to a corresponding one of the electrode leads and another end exposed at an upper side of the cell case.

12 Claims, 9 Drawing Sheets

(51) Int. Cl.
*H01M 50/20* (2021.01)
*H01M 50/50* (2021.01)

(56) References Cited

U.S. PATENT DOCUMENTS

| | | | |
|---|---|---|---|
| 2013/0149563 A1 | 6/2013 | Lee et al. | |
| 2014/0127550 A1 | 5/2014 | Roh et al. | |
| 2015/0037626 A1* | 2/2015 | Malcolm | B60L 50/64 429/53 |
| 2015/0064502 A1 | 3/2015 | Hong | |
| 2015/0064540 A1 | 3/2015 | Roh et al. | |
| 2015/0079447 A1 | 3/2015 | Park et al. | |
| 2016/0126523 A1* | 5/2016 | Arena | H01M 10/625 429/90 |
| 2016/0233465 A1 | 8/2016 | Lee et al. | |
| 2016/0322838 A1 | 11/2016 | Jung | |
| 2017/0309869 A1 | 10/2017 | Kim et al. | |
| 2018/0159096 A1 | 6/2018 | Kim et al. | |
| 2018/0175464 A1 | 6/2018 | Kim et al. | |

FOREIGN PATENT DOCUMENTS

| | | | | |
|---|---|---|---|---|
| JP | 2006202629 A | | 8/2006 | |
| JP | 2014203763 A | | 10/2014 | |
| JP | 2015022849 A | * | 2/2015 | ........ H01M 10/0413 |
| JP | 2017084468 A | | 5/2017 | |
| KR | 20130012547 A | | 2/2013 | |
| KR | 20130065291 A | | 6/2013 | |
| KR | 20130137299 A | | 12/2013 | |
| KR | 20150027579 A | | 3/2015 | |
| KR | 20160016503 A | | 2/2016 | |
| KR | 20160128792 A | | 11/2016 | |
| KR | 20170035218 A | | 3/2017 | |
| KR | 20170037125 A | | 4/2017 | |
| KR | 20170050509 A | | 5/2017 | |
| KR | 20170053429 A | | 5/2017 | |
| KR | 20170065864 A | | 6/2017 | |
| WO | WO-2014171250 A1 | * | 10/2014 | ............ H01M 50/20 |
| WO | WO-2015030403 A1 | * | 3/2015 | .......... H01M 10/482 |
| WO | 2017082528 A1 | | 5/2017 | |

OTHER PUBLICATIONS

International Search Report for Application No. PCT/KR2018/003940 dated Aug. 3, 2018.
Extended European Search Report with Written Opinion for Application No. 18818014.5 dated May 20, 2020, 15 pages.
Search Report from Office Action for Chinese Application No. 2018800064917 dated Jul. 5, 2021; 3 pages.

* cited by examiner

BATTERY MODULE, BATTERY PACK INCLUDING BATTERY MODULE, AND VEHICLE INCLUDING BATTERY PACK

CROSS-REFERENCE TO RELATED APPLICATIONS

The present application is a national phase entry under 35 U.S.C. § 371 of International Patent Application No. PCT/KR2018/003940, filed on Apr. 3, 2018, published in Korean, which claims priority from Korean Patent Application No. 10-2017-0076764, filed on Jun. 16, 2017, the disclosures of which are hereby incorporated herein by reference.

TECHNICAL FIELD

The present disclosure relates to a battery module, a battery pack including the battery module, and a vehicle including the battery pack.

BACKGROUND ART

Secondary batteries which are highly applicable to various products and exhibit superior electrical properties such as high energy density, etc. are commonly used not only in portable devices but also in electric vehicles (EVs), hybrid electric vehicles (HEVs), golf carts or the like, driven by electrical power sources. The secondary battery is drawing attention as a new energy source for enhancing environment friendliness and energy efficiency in that the use of fossil fuels can be reduced greatly and no byproduct is generated during energy consumption.

Secondary batteries widely used at the present include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.6V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module composed of at least one battery cell first, and then configure a battery pack by using at least one battery module and adding other components.

A conventional battery module generally includes a plurality of battery cells electrically connected to each other and a module case accommodating the plurality of battery cells. Here, the electrical connection of the plurality of battery cells is achieved by welding, which is performed after electrode leads of the battery cells are stacked in layers. More specifically, the electrode leads stacked together for welding are partially disposed inside the module case, and the remaining parts are exposed out of the module case for welding. Accordingly, in the conventional battery module, a space is required so that the electrode leads stacked together are partially disposed in the module case for welding.

However, the space where the electrode leads are partially disposed is a dead space that is independent of the energy density of the battery cells, and thus may deteriorate the capacity of the entire battery module.

DISCLOSURE

Technical Problem

The present disclosure is directed to providing a battery module capable of minimizing a dead space that may be created for electrically connecting electrode leads of battery cells, a battery pack including the battery module, and a vehicle including the battery pack.

In addition, the present disclosure is directed to providing a battery module capable of improving the energy density by increasing the capacity, a battery pack including the battery module, and a vehicle including the battery pack.

Technical Solution

In one aspect of the present disclosure, there is provided a battery module, comprising: at least one battery cell having electrode leads protruding at first and second opposite sides thereof; and at least one cell case each covering the first and second sides and an upper side of a corresponding one of the at least one battery cell and each including a pair of bus bars each having one end connected to a corresponding one of the electrode leads and another end exposed at an upper side of the cell case.

Each of the at least one battery cell may include: an electrode assembly; a battery case having a case body accommodating the electrode assembly therein and a case terrace extending from the case body; and the electrode leads protruding at first and second opposite sides of the case terrace, wherein the cell case covers the first and second sides of the case terrace and an upper side of the battery case.

Each of the at least one cell case may include: a first case frame and a second case frame configured to cover the first and second sides of the case terrace, respectively; and a third case frame covering the upper side of the battery case and connecting the first case frame and the second case frame.

Each pair of bus bars may include: a first bus bar disposed on the respective first case frame and the respective third case frame and connected to one of the electrode leads; and a second bus bar disposed on the respective second case frame and the respective third case frame and connected to another one of the electrode leads.

The first case frame and the second case frame each may have a bus bar placing groove at which the first and second bus bars are disposed, respectively.

Each of the pair of bus bars may include: a body plate disposed at the respective bus bar placing groove; a lead connection portion extending from one end of the body plate and welded to the respective electrode lead; and an upper exposed portion extending from the other end of the body plate and disposed on the third case frame.

The lead connection portion of each bus bar may have a step from the body plate and may contact the electrode lead when the body plate is disposed at the bus bar placing groove.

The at least one battery cell may be a plurality of battery cells that are stacked on one another, and the cell case may be a plurality of cell cases that are stacked on one another while fixing the battery cells, respectively.

The battery module may further comprise at least one fixing beam mounted through the plurality of cell cases to fix the plurality of cell cases to one another.

The battery module may further comprise a top cover configured to cover upper sides of the plurality of cell cases and having a bus bar exposing opening at which the another end of each of the bus bars is exposed.

The battery module may further comprise at least one bus bar connecting member electrically connected to the bus bars exposed at the top cover in series or in parallel.

The battery module may further comprise a bottom cover configured to cover lower sides of the plurality of cell cases and configured to mechanically support the plurality of cell cases.

The battery module may further comprise a heat transfer member disposed between the plurality of cell cases and the bottom cover.

In another aspect of the present disclosure, there is also provided a battery pack, comprising: at least one battery module according to the above embodiments; and a pack case configured to contain the at least one battery module therein.

In another aspect of the present disclosure, there is also provided a vehicle, comprising at least one battery pack according to the above embodiments.

Advantageous Effects

According to various embodiments as above, it is possible to provide a battery module capable of minimizing a dead space that may be created for electrically connecting electrode leads of battery cells, a battery pack including the battery module, and a vehicle including the battery pack.

In addition, according to various embodiments as above, it is possible to provide a battery module capable of improving the energy density by increasing the capacity, a battery pack including the battery module, and a vehicle including the battery pack.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
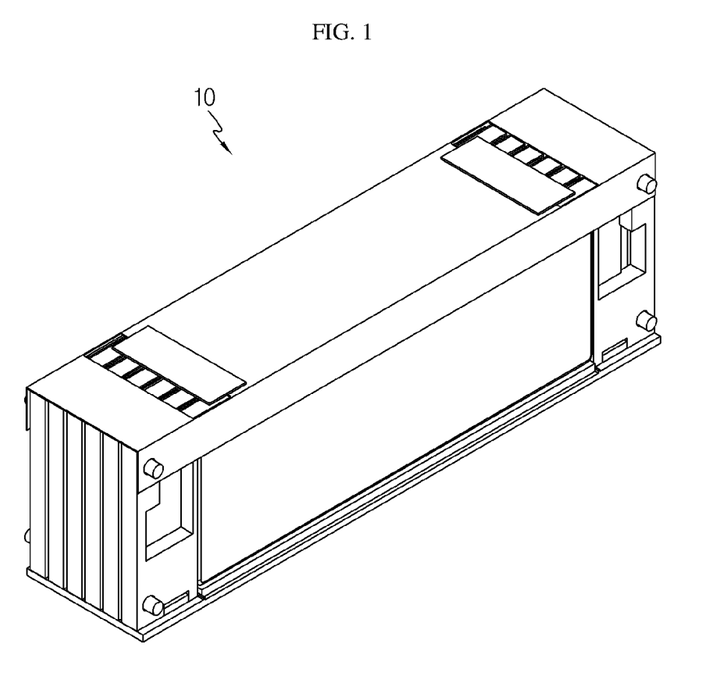
FIG. 1 is a diagram for illustrating a battery module according to an embodiment of the present disclosure.
Figure 2:
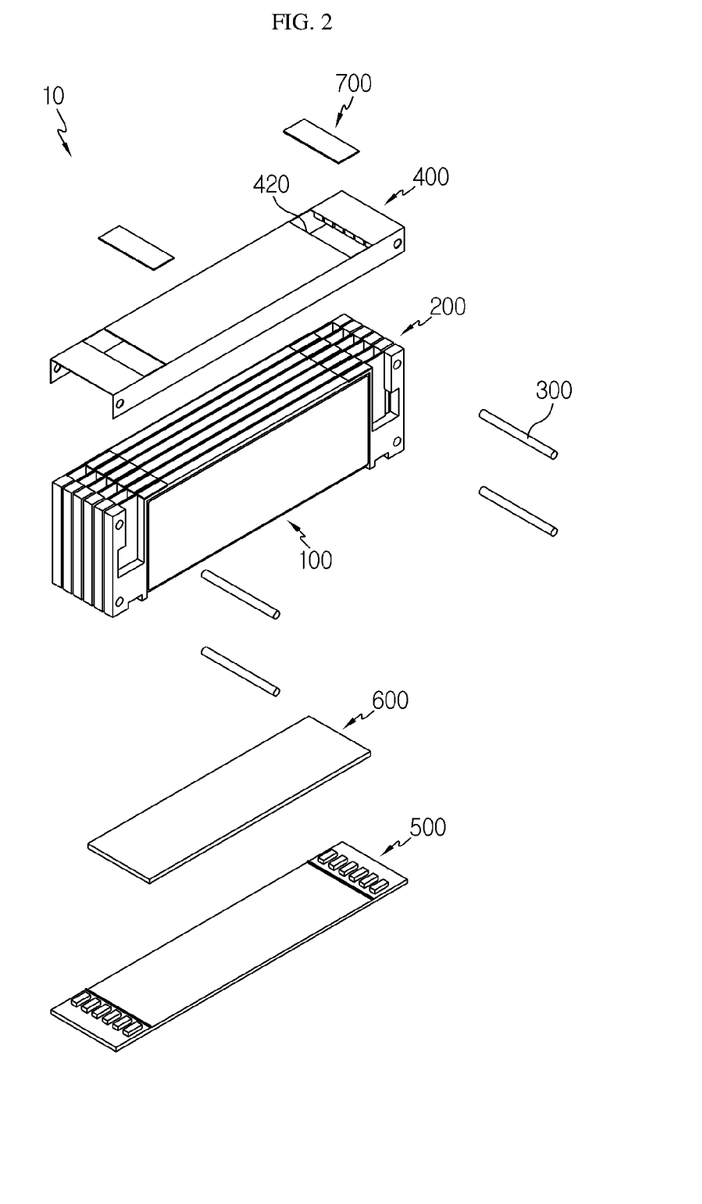
FIG. 2 is an exploded perspective view showing the battery module of FIG. 1.
Figure 3:
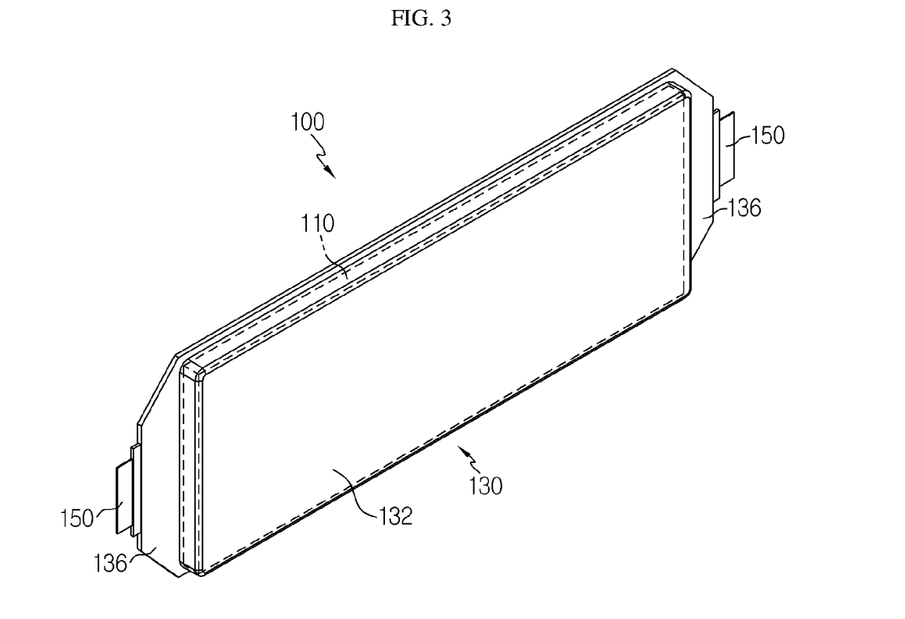
FIG. 3 is a diagram for illustrating a battery cell of the battery module of FIG. 2.
Figure 4:
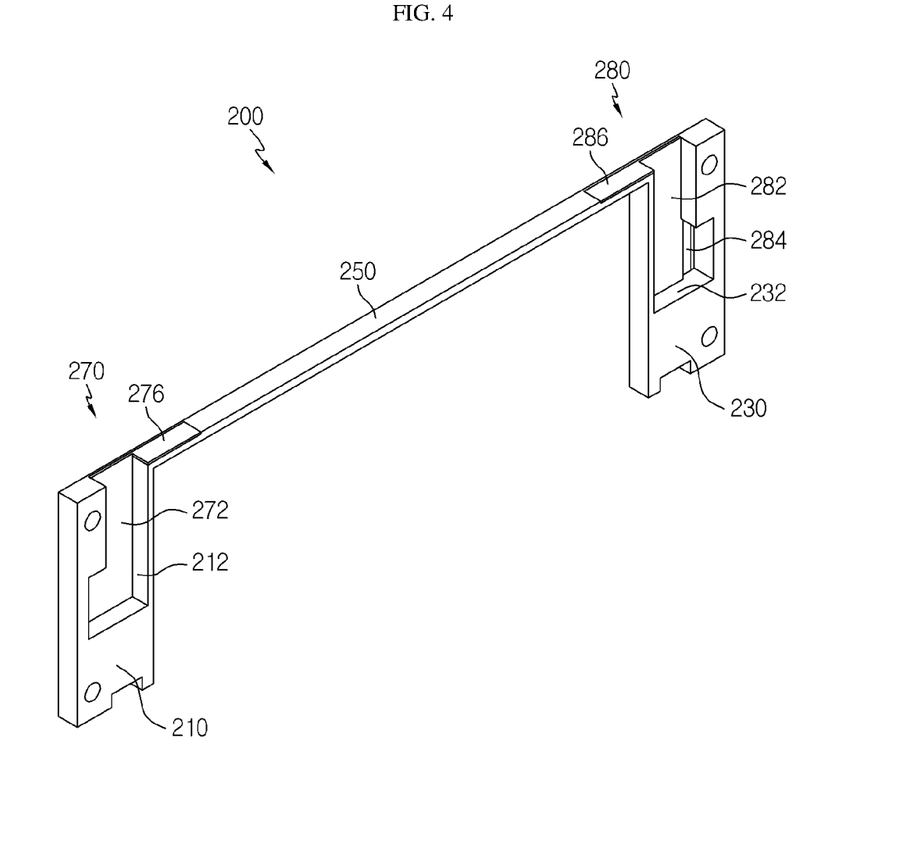
FIG. 4 is a diagram for illustrating a cell case of the battery module of FIG. 2.

FIG. 1 is a diagram for illustrating a battery module according to an embodiment of the present disclosure, FIG. 2 is an exploded perspective view showing the battery module of FIG. 1, FIG. 3 is a diagram for illustrating a battery cell of the battery module of FIG. 2, and FIG. 4 is a diagram for illustrating a cell case of the battery module of FIG. 2.

Referring to FIGS. 1 to 4, a battery module 10 may include a battery cell 100, a cell case 200, a fixing beam 300, a top cover 400, a bottom cover 500, a heat transfer member 600 and a bus bar connecting member 700.

The battery cell 100 is a secondary battery, which may be a pouch-type secondary battery. The battery cell 100 may be provided in plural, and the plurality of battery cells may be stacked on one another and electrically connected to each other.

Each of the plurality of battery cells 100 may include an electrode assembly 110, a battery case 130, and an electrode lead 150.

The electrode assembly 110 may include a positive electrode plate, a negative electrode plate and a separator. The electrode assembly 110 is well known in the art and thus will not be described in detail.

The battery case 130 may be made of a laminate sheet including a resin layer and a metal layer and may package the electrode assembly 110. The battery case 130 may include a case body 132 and a case terrace 136.

The case body 132 may accommodate the electrode assembly 110. For this, the case body 132 may have an accommodation space formed therein for accommodating the electrode assembly 110. The case terrace 136 extends from the case body 132 and may be sealed to package the electrode assembly 110.

The electrode lead 150 is provided in a pair, and the pair of electrode leads 150 may be composed of a positive electrode lead and a negative electrode lead. The pair of electrode leads 150 are electrically connected to the electrode assembly 110 and may protrude out on at least one side of the case terrace 136 of the battery case 130, specifically on both sides of the case terrace 136.

The cell case 200 may cover both sides and an upper side of the at least one battery cell 100. Specifically, the cell case 200 may be provided in plural, and each cell case 200 may cover both sides and the upper side of each battery cell 100. Specifically, each cell case 200 may cover both sides of the case terrace 136 and an upper side of the battery case 130. The plurality of cell cases 200 may be stacked on one another while fixing the battery cells 100, respectively.

Each of the plurality of cell cases 200 may include a first case frame 210, a second case frame 230, a third case frame 250 and a pair of bus bars 270, 280.

The first case frame 210 may cover any one of both sides of the case terrace 136 of the battery cell 100. The first case frame 210 may have a bus bar placing groove 212 formed for placing the first bus bar 270, explained later.

The second case frame 230 may cover the other one of both sides of the case terrace 136 of the battery cell 100. The second case frame 230 may have a bus bar placing groove 232 formed for placing the second bus bar 280, explained later.

The third case frame 250 may be formed with a predetermined length, cover the upper side of the battery case 130, and connect the first case frame 210 and the second case frame 230.

The pair of bus bars 270, 280 are for electrical connection with the electrode lead 150 of the battery cell 100, and one end 274 thereof is connected to the electrode lead 150 and the other end 276 is exposed at the upper side of the cell case 200.

Specifically, the pair of bus bars 270, 280 may be composed of a first bus bar 270 and a second bus bar 280.

The first bus bar 270 is placed on the first case frame 210 and the third case frame 250 and may be connected to the electrode lead 150 that protrudes at any one of both sides of the case terrace 136 of the battery cell 100.

The first bus bar 270 may include a body plate 272, a lead connection portion 274 (see FIG. 7) and an upper exposed portion 276.

The body plate 272 may be made of metal material and be placed on the bus bar placing groove 212 of the first case frame 210.

Figure 7:
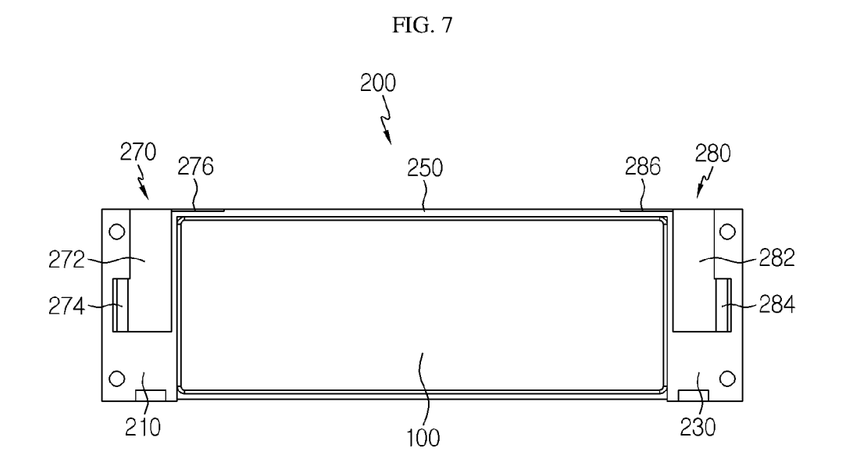

The lead connection portion 274 extends from one end of the body plate 272 and may be electrically connected to the electrode lead 150 by welding or the like. Specifically, the lead connection portion 274 may be formed to have a step from the body plate 272 and be disposed to contact the electrode lead 150 located at the rear when the body plate 272 is placed at the bus bar placing groove 212. After that, the lead connection portion 274 may be connected to the contacted electrode lead 150 by welding or the like.

The upper exposed portion 276 extends from the other end of the body plate 272 and may be placed on the third case frame 250. The upper exposed portion 276 may be electrically connected to the bus bar connecting member 700, explained later.

The second bus bar 280 is placed on the second case frame 230 and the third case frame 250 and may be connected to the electrode lead 150 that protrudes at the other one of both sides of the case terrace 136 of the battery cell 100.

The second bus bar 280 may include a body plate 282, a lead connection portion 284 and an upper exposed portion 286, similar to the first bus bar 270.

The body plate 282 may also be made of metal material, similar to the body plate 272 of the first bus bar 270, and may be placed on the bus bar placing groove 232 of the second case frame 230.

The lead connection portion 284 extends from one end of the body plate 282 and may be electrically connected to the electrode lead 150 by welding or the like. Specifically, the lead connection portion 284 may be formed to have a step from the body plate 282 and be disposed to contact the electrode lead 150 located at the rear when the body plate 282 is placed at the bus bar placing groove 232. After that, the lead connection portion 284 may be connected to the contacted electrode lead 150 by welding or the like.

The upper exposed portion 286 extends from the other end of the body plate 282 and may be placed on the third case frame 250. The upper exposed portion 286 may be electrically connected to the bus bar connecting member 700, explained later.

The fixing beam 300 may be mounted through the plurality of cell cases 200 to fix the plurality of cell cases 200. The fixing beam 300 may be provided in plural to improve the fixing force between the plurality of cell cases 200.

The top cover 400 may cover the upper side of the plurality of cell cases 200. The top cover 400 may have a bus bar exposing opening 420 for exposing the other end 276, 286 of the plurality of bus bars 270, 280, namely the upper exposed portions 276, 286.

The bottom cover 500 covers the lower side of the plurality of cell cases 200 and the lower side of the plurality of battery cells 100 and may support the plurality of cell cases 200 and the plurality of battery cells 100.

The heat transfer member 600 is provided between the plurality of cell cases 200 and the bottom cover 500 and may transfer the heat of the plurality of battery cells 100 toward the bottom cover 500 more quickly.

The bus bar connecting member 700 may be electrically connected to the bus bars 270, 280 exposed from the top cover 400. In this embodiment, the bus bar connecting member 700 may be provided for parallel connection.

Accordingly, the bus bar connecting member 700 is provided in a pair such that any one bus bar connecting member 700 may connect the first bus bars 270 to each other and the other bus bar connecting member 700 may connect the second bus bars 280 to each other.

Hereinafter, the assembling process of the battery module 10 according to this embodiment will be described in more detail.

FIGS. 5 to 8 are diagrams for illustrating a process of assembling the battery cell and the cell case of the battery module of FIG. 2.

Figure 5:
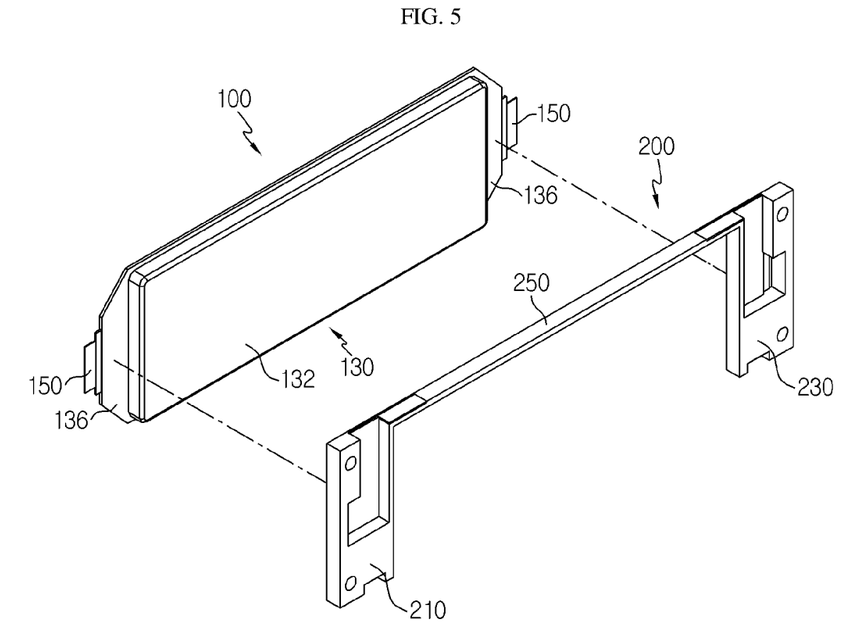
FIGS. 5 to 8 are diagrams for illustrating a process of assembling the battery cell and the cell case of the battery module of FIG. 2.
Figure 6:
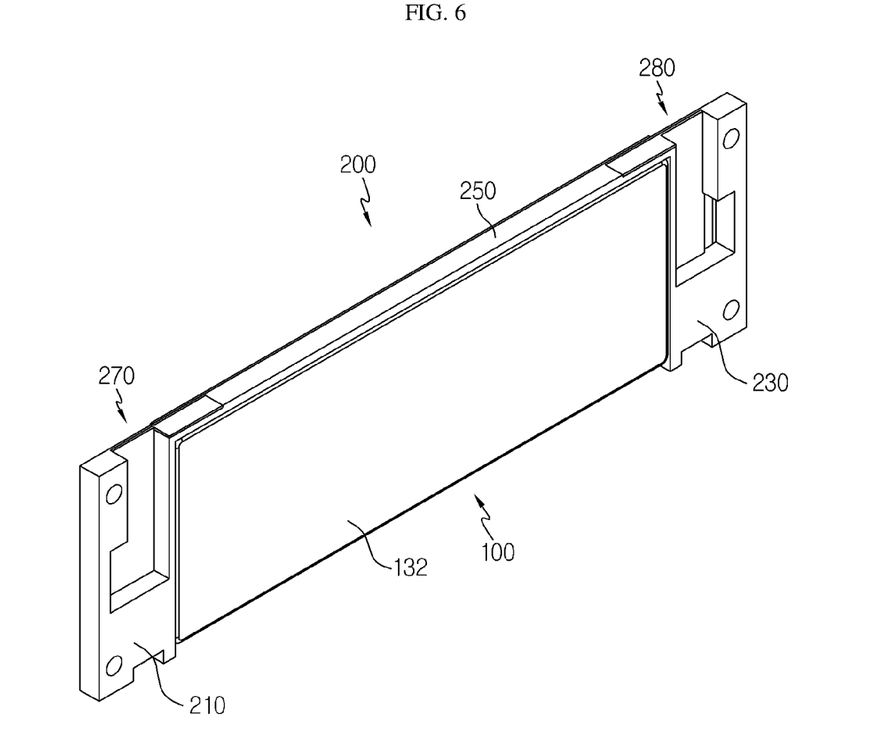

Referring to FIGS. 5 and 6, a worker or the like may dispose the cell case 200 in front of the battery cell 100 and then connect the battery cell 100 and the cell case 200 to each other. At this time, the first case frame 210 and the second case frame 230 of the cell case 200 may cover the front of both sides of the case terrace 136 of the battery cell 100.

Accordingly, the battery cell 100 may realize a rectangular form by coupling with the cell case 200. That is, even if the battery cell 100 is the pouch-type secondary battery, since the battery cell 100 may realize a rectangular form by coupling with the cell case 200, a higher capacity may be obtained than in the case where a plurality of battery cells are stacked, and also it may be advantageous in terms of automation and component sharing of the assembling process.

Figure 8:
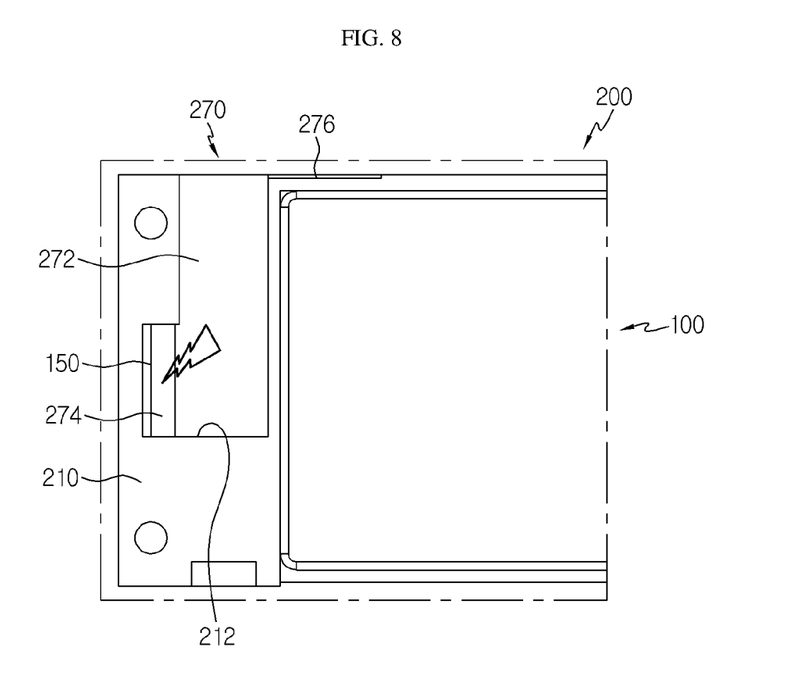

Referring to FIGS. 7 and 8, after that, a worker or the like may weld the lead connection portion 274 of the first bus bar 270 placed on the first case frame 210 and the electrode lead 150 disposed to contact the lead connection portion 274 at the rear of the lead connection portion 274 by laser welding or the like.

As the battery cell 100 and the cell case 200 are connected, the electrode lead 150 naturally comes into contact with the lead connection portion 274 at the rear of the lead connection portion 274 of the first bus bar 270, and thus the welding process may be performed more conveniently.

The worker or the like may also weld the electrode lead 150 with the second bus bar 280 placed on the second case frame 230 in a similar manner.

After that, the worker or the like may stack the plurality of cell cases 200 coupled to the battery cells 100 and then electrically connect the bus bar connecting member 700 and the bus bars 270, 280 at the upper side of the cell cases 200.

As described above, in this embodiment, the electrical connection to the bus bar connecting member 700 may be performed more conveniently at the upper side of the battery module 10 via the upper exposed portions 276, 286 of the bus bars 270, 280 exposed at the upper side of the cell case 200.

Also, in this embodiment, one end of the bus bars 270, 280 mounted to the cell case 200 is connected to the electrode lead 150 at the front of the case terrace 136 of the battery cell 100 and the other end is connected to the bus bar connecting member 700 at the upper side of the battery module 10 toward the upper side of the battery module 10. Thus, the bending space demanded for connecting the electrode leads 150 of the battery cells 100 to each other is not needed, thereby minimizing the generation of a dead space in the battery module 10.

As described above, the battery module 10 according to this embodiment may minimize a dead space that may be generated when electrically connecting the electrode leads 150 of the battery cells 100 through the cell case 200 and the bus bars 270, 280 assembled to the cell case 200.

Accordingly, the battery module 10 according to this embodiment may further increase the capacity of the battery module 10, and thus it is possible to further improve the energy density of the battery module 10.

Figure 9:
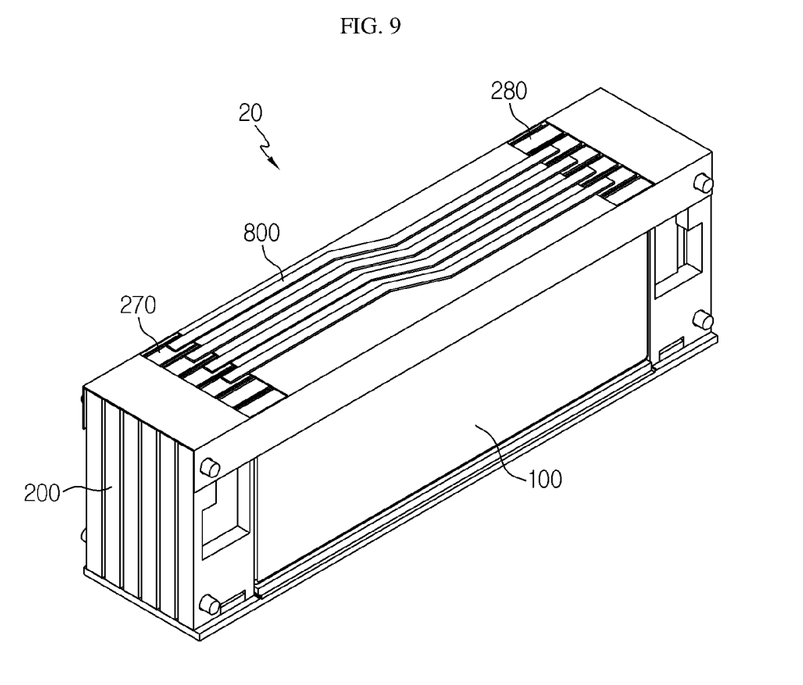
FIG. 9 is a diagram for illustrating a battery module according to another embodiment of the present disclosure.

FIG. 9 is a diagram for illustrating a battery module according to another embodiment of the present disclosure.

The battery module 20 according to this embodiment is similar to the battery module 10 of the former embodiment, and thus different features from the former embodiment will be described in detail.

Referring to FIG. 9, the battery module 20 may be connected in series, unlike the former embodiment. For this, the battery module 20 may include a bus bar connecting member 800 for serial connection.

The bus bar connecting member 800 may be formed to have a predetermined length and may be provided in plural. The plurality of bus bar connecting members 800 may connect the first bus bar 270 and the second bus bar 280, corresponding to each other, for serial connection.

As described above, the battery module 20 may be connected in series, unlike the former embodiment, and the serial connection may also be performed more conveniently at the upper side of the plurality of cell cases 200 through the plurality of cell cases 200.

Figure 10:
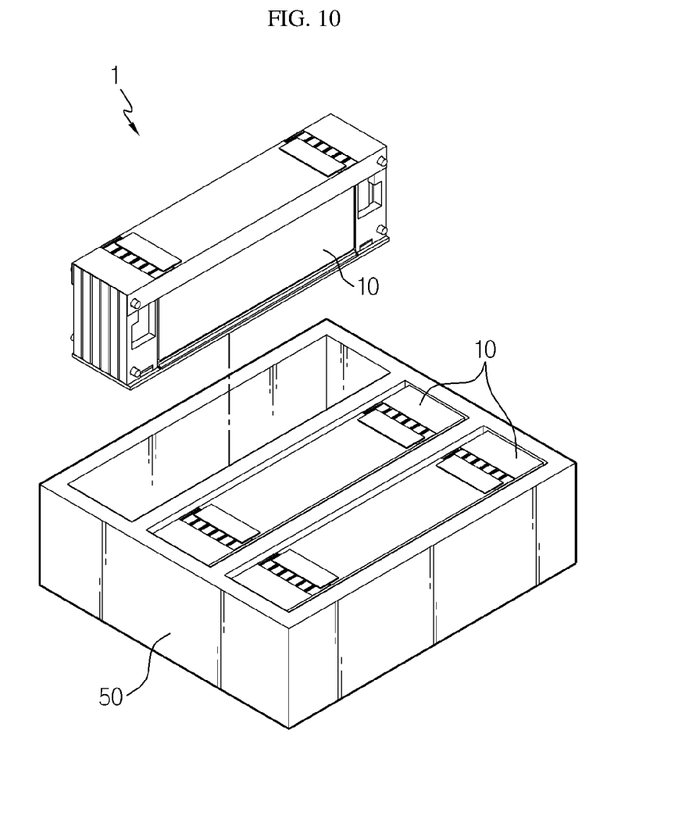
FIG. 10 is a diagram for illustrating a battery pack according to an embodiment of the present disclosure.

FIG. 10 is a diagram for illustrating a battery pack according to an embodiment of the present disclosure.

Referring to FIG. 10, a battery pack 1 may include at least one battery module 10 according to the former embodiment and a pack case 50 for packaging the at least one battery module 10. Moreover, the battery pack 1 may also include at least one battery module 20 of the former embodiment.

The battery pack 1 may be provided to a vehicle as a fuel source of the vehicle. As an example, the battery pack 1 may be provided to an electric vehicle, a hybrid vehicle, and various other-type vehicles capable of using the battery pack 1 as a fuel source. In addition, the battery pack 1 may be provided in other devices, instruments or facilities such as an energy storage system using a secondary battery, in addition to the vehicle.

As described above, the battery pack 1 of this embodiment and devices, instruments or facilities such as a vehicle, which have the battery pack 1, include the battery module 10 as described above, and thus it is possible to implement a battery pack 1 having all the advantages of the battery module 10 described above, or devices, instruments, facilities or the like such as a vehicle, which have the battery pack 1.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery module, comprising:
    at least one battery cell having electrode leads extending in a length direction and protruding at first and second opposite sides thereof, each of the at least one battery cell having first and second planar sides each extending in the length direction and in a height direction perpendicular to the length direction; and
    at least one cell case each covering the first and second sides and an upper side of a corresponding one of the at least one battery cell and each including a pair of bus bars each having one end connected to a corresponding one of the electrode leads and another end exposed at an upper side of the cell case, the upper side of the cell case extending in the length direction and in a width direction perpendicular to the length direction and the height direction,
    wherein each battery cell includes a battery case having a case body accommodating an electrode assembly therein and a case terrace extending from the case body, the electrode leads protruding at first and second opposite sides of the case terrace, the cell case having first and second case frames covering the respective first and second sides of the case terrace, the cell case having a third case frame covering and an upper side of the battery case and connecting the first case frame with the second case frame, a bottom of each battery cell being exposed at a bottom of the respective battery case, and
    wherein each bus bar includes a planar body plate extending in the height and length directions, a lead connection portion extending from one end of the respective body plate in the length direction, and an upper exposed portion extending from another end of the respective body plate in the length direction and disposed on the third case frame, each of the electrode leads extending through a slot in a respective one of the first and second case frames adjacent to a respective one of the lead connection portions, each lead connection portion being welded to a respective one of the electrode leads, first and second portions of each case terrace extending parallel to and adjacent to a respective one of the planar body plates.

2. The battery module according to claim 1, wherein each pair of bus bars include:
    a first bus bar disposed on the respective first case frame and the respective third case frame and connected to one of the electrode leads; and
    a second bus bar disposed on the respective second case frame and the respective third case frame and connected to another one of the electrode leads.

3. The battery module according to claim 1, wherein the first case frame and the second case frame each have a bus bar placing groove at which the first and second bus bars are disposed, respectively.

4. The battery module according to claim 1,
    wherein the lead connection portion of each bus bar has a step from the body plate and contacts the electrode lead when the body plate is disposed at the bus bar placing groove.

5. The battery module according to claim 1,
    wherein the at least one battery cell is a plurality of battery cells that are stacked on one another, and wherein the at least one cell case is a plurality of cell cases that are stacked on one another while fixing the battery cells, respectively.

6. The battery module according to claim 5, further comprising:
at least one fixing beam mounted through the plurality of cell cases to fix the plurality of cell cases to one another.

7. The battery module according to claim 5, further comprising:
a top cover configured to cover upper sides of the plurality of cell cases and having a bus bar exposing opening at which the another end of each of the bus bars is exposed.

8. The battery module according to claim 7, further comprising:
at least one bus bar connecting member electrically connected to the bus bars exposed at the top cover in series or in parallel.

9. The battery module according to claim 5, further comprising:
a bottom cover configured to cover lower sides of the plurality of cell cases and configured to mechanically support the plurality of cell cases.

10. The battery module according to claim 9, further comprising:
a heat transfer member disposed between the plurality of cell cases and the bottom cover.

11. A battery pack, comprising:
at least one battery module as claimed in claim 1; and
a pack case configured to contain the at least one battery module therein.

12. A vehicle, comprising:
at least one battery pack as claimed in claim 11.

* * * * *